(12) United States Patent
Wakatabi et al.

(10) Patent No.: US 7,428,073 B2
(45) Date of Patent: Sep. 23, 2008

(54) POST CARD MAKING DEVICE

(75) Inventors: Tadayuki Wakatabi, Inashiki-gun (JP); Kouki Mitani, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 859 days.

(21) Appl. No.: 10/854,706

(22) Filed: May 27, 2004

(65) Prior Publication Data

US 2005/0002062 A1    Jan. 6, 2005

(30) Foreign Application Priority Data

Jul. 4, 2003    (JP)    ............................. 2003-191716

(51) Int. Cl.
*G06F 15/00* (2006.01)
*G01D 15/28* (2006.01)

(52) U.S. Cl. .................... 358/1.18; 358/1.12; 358/3.32; 358/502; 347/152

(58) Field of Classification Search ................ 358/1.18, 358/472, 3.02, 3.09, 1.12, 1.9, 1.83, 501, 358/502, 503, 491, 474, 1.2, 498, 3.32; 347/20, 347/24, 2, 129, 152; 400/634; 101/93.04; 283/2, 117

See application file for complete search history.

(56) References Cited

U.S. PATENT DOCUMENTS

| | | | | | |
|---|---|---|---|---|---|
| 5,641,086 | A | * | 6/1997 | Sonntag et al. | 220/845 |
| 6,160,642 | A | * | 12/2000 | Mui et al. | 358/498 |
| 6,441,921 | B1 | * | 8/2002 | Soscia | 358/1.9 |
| 6,500,523 | B1 | * | 12/2002 | Hirose et al. | 428/32.21 |
| 6,909,526 | B1 | * | 6/2005 | Dawe | 358/471 |

FOREIGN PATENT DOCUMENTS

JP    Y2 57-15814    4/1982
JP    A 2004-104665    4/2004

* cited by examiner

*Primary Examiner*—King Poon
*Assistant Examiner*—Steven Kau
(74) *Attorney, Agent, or Firm*—Oliff & Berridge, PLC

(57) ABSTRACT

To make it possible with a post card making device composed of an original reading device and an image printing device that an image is prepared on an upward facing original image preparation surface, and in that condition, the original image can be read in by the original reading device as precisely positioned, and further the original reading device and the image printing device are assembled to an integral unit for storage, an original placing and storage assisting device is provided so as to present an original image preparing surface and to be connected to the image printing device by sandwiching the original reading device therebetween.

8 Claims, 2 Drawing Sheets

POST CARD MAKING DEVICE

BACKGROUND OF THE INVENTION

1. Field of the Invention

The present invention relates to a device for making a letter by a card in which individual expressions of a sender are important as in the new year card, the inquiry after his/her health in the hot season, and the Christmas card. (These cards are referred to as "post cards" hereinunder.) Further, the "making" of the post card herein referred to means all works starting from a creation of an image of the post card to the printing of the image on the post card.

2. Description of the Prior Art

The post cards are golden means for each sender to let his/her friends or acquaintances, mostly long neglected to write, remember him/her with an exhibition of his/her individuality, and therefore, it is strongly desired that they are designed by each individual creation. However, except those very limited persons who are daily executing the techniques suited for making the post cards such as the writers of comic pictures or illustrations or the calligraphers, it is very difficult for many people to individually create the post cards to be satisfactorily designed. Therefore, there are distributed various design collections for the new year cards or the like bearing prints of various pictures, patterns or letters prepared by the professionals, so that some of those pictures, patterns or letters are optionally cut out therefrom to make the post cards by a combination of them, with an addition of one's own writing, when desired.

As a post card making device convenient for designing post cards by a combination of those pictures or the like and printing, the applicant of the present application has once proposed a device called "PRINTGOCCO" (Trademark) which executes the post card making by an art of stencil printing, as described in Japanese Utility Model Publication Showa 57-15814. This device comprises a lower frame presenting an original placing tray of a size of the post card, and an upper frame connected to the lower frame to be pivotable up and down relative thereto, the upper frame having a glass window positioned so as to be laid over the original placing tray when the upper frame is closed upon the lower frame, wherein a stencil plate is mounted to the lower face of the glass window, and a flash lamp is turned on from the upper side of the glass window. By using such a device, when a desired image is designed on the original placing tray by assembling cut out pictures, letters or the like, then the upper frame is lowered toward the lower frame with a stencil plate mounted to the lower face of the glass plate to be laid over the assembled image, then the stencil plate is pressed upon the assembled image, and then the flash lamp is turned on above the glass plate, a stencil printing plate perforated according to the assembled image is obtained, to be able to make post cards bearing individually original designs even by an assembly of cut out pictures, letters or the like.

However, nowadays it has become possible to readily make an assembled image by assembling prepared picture elements, letters and the like in the display of a computer according to the developments of the image processing technique by computer. Nevertheless, the image processing by computer demands a basic knowledge with regard to the operation of the computer and a substantial knowledge and training with regard to the handling of the respective image processing software programs. There is a substantial difficulty in demanding such knowledge and trainings by the current middle and high aged people.

The matters concerned with the computer and various computer software programs are mostly mere matters of stipulation, not theoretically systemized. Therefore, they can be half habitually executed when daily practiced, while when not practiced for a while, the execution thereof is puzzling as the first time execution. The new year cards and the Christmas cards are made one time in a year. Therefore, even for those who are customized to send post cards for inquiring his/her health in the hot season, it is every half year to make the post cards. For those not daily practicing the computer, the operation of the computer, particularly the image processing by the computer after a half year or a year is every time a very difficult work.

Further, it is often desired to enter some words of compliments by one's own autograph in the new year cards, hot season inquiring cards or Christmas cards. This is not available in the computer display. Of course, when there is a scanner, it is possible to write such words by autograph once on a sheet and to bring them into the computer by letting the scanner read them. However, to do so the scanner is required in addition to the computer and the printer, and a further knowledge with regard to the connection and the handling of the scanner.

On the other hand, the developments of the digital color printing technique employing the ink jet combined with the computer are remarkable, with a steep increase of the quality and speed of printing, while the prices of the printers are rapidly lowing as inversely proportional. The benefits provided by such developments of the digital color printing technique should be widely and equally enjoyed as not limited to those familiar with the computers.

In view of the above situations, as a post card making device by which the art of assembling cut out pictures, letters or the like practiced with the conventional PRINTGOCCO is also usable to make the new year card, hot season inquiring cards, Christmas cards and the like, for those not daily familiar with the computers, while utilizing the ink jet digital printers whose performance is daily improving with their prices daily lowering, the present applicant has proposed by Japanese Patent Application 2002-266706 "a post card making device characterized by a combination of an original reading device having an original reading window of a size of the post card and an image sensor for reading an image exhibited to the original reading window to generate an image signal expressing the read in image, an image printing device constructed as a device separate from the original reading device to comprise a signal processing means for processing the image signal and a fine ink jet digital color printing means for printing an image corresponding to the image signal, and a signal transmitting means for transmitting the image signal from the original reading device to the image printing device".

In the post card making device shown as an embodiment in the above-mentioned prior patent application, the original reading device having a housing of an external shape like a rectangular thick plate with an original reading window of a size of the post card in one face of the housing and an image sensor mounted in the housing to read an image exhibited to the original reading window to generate the image signal expressing the read-in image, is equipped with a cover plate hinged along one side of the rectangular contour thereof so that, when an image was designed on the original reading window by combining cut out pictures, letters or the like, the original reading device can be operated not to disturb the design. To do so, after the completion of a designing, the cover plate is turned along the hinge so as to be placed over the original reading window to press the designed original from above, not to disturb the design of the original. In this case however, for the original designed on the original reading window to be pressed from above by the cover plate after the completion, the original reading window must be a window opened upward, and therefore the original must be prepared toward downward. This is inconvenient for the designing work. When the original was designed on an optional plane surface such as a table surface or the like, the original reading device must be placed on the original with its original reading window facing downward, making it difficult to correctly position the original reading device relative to the original.

Further, since the post card making device is composed of the original reading device and the image printing device separate from one another, it is required to handle two separate devices in storing or taking out the post card making device, to be troublesome and requiring a care not to let the two devices separated from one another.

SUMMARY OF THE INVENTION

It is the object of the present invention to solve the above-mentioned two problems with regard to the post card making device composed of the original reading device and the image printing device by a means common for the two problems, so as to further improve the post card making device of this kind.

According to the present invention, the above-mentioned object is accomplished by a post card making device of such a construction as described below.

The post card making device comprises a combination of an original reading device, an image printing device and an original placing and storage assisting device, The original reading device, i.e. the device to read in originals to be printed, has a housing of an external shape like a rectangular thick plate with an original reading window, i.e. window to read in originals to be printed, of a size of a post card in one face thereof and an image sensor mounted in the housing for reading an image exhibited to the original reading window and generating an image signal expressing the read-in image.

The image printing device, i.e. the device to print images, has a signal processing means for processing the image signal and an ink jet printing means for printing an image corresponding to the image signal.

The original placing and storage assisting device serves as an original placing tray for supporting an original to be printed which may be a sheet exhibiting an image as positioned relative to the original reading device when the image is read in by the original reading device and also serving as a means for assembling the original reading device to a bottom of the image printing device to form an integral unit for storage.

The bottom of the image printing device may present a rectangular contour substantially equal to the rectangular contour presented by the housing of the original reading device.

The original placing and storage assisting device may include a plate member of a rectangular contour substantially equal to the rectangular contour presented by the housing of the original reading device and connecting means for connecting the plate member to the image printing device in a condition that the original reading device is sandwiched between the plate member and the bottom of the image printing device.

The connecting means may be turning ear members hinged to two opposite sides of the rectangular contour of the plate member to be latched to side walls of the image printing device across the thickness of the original reading device.

The image printing device may be provided with a handle at an upper portion thereof to be suspended thereby from an upside thereof with the bottom thereof facing downward.

When the post card making device is so constructed as to comprise an original reading device and an image printing device, wherein the original reading device comprises the housing of an external shape like a rectangular thick plate, with the original reading window of a size of the post card being provided in one face thereof, and the image sensor provided in the housing to read the image exhibited to the original reading window and then generate the image signal expressing the image, while on the other hand the image printing device is equipped with the signal processing device for processing the image signal and the ink jet printing means, so as to print the image corresponding to the image signal, and further there is provided the original placing and storage assisting device serving as the original placing tray for supporting a sheet expressing an image as positioned relative to the original reading device when the image is read by the original reading device and also serving as a means for mounting the original reading device to the bottom of the image printing device to integrate the whole devices, there is obtained such an advantage that the designing of an image by a combination of cut out pictures, letters or the like can be done on the original placing and storage assisting device in such a manner that the image thus prepared faces upward, and therefore the original reading device can be placed on the designed image as precisely positioned relative to the image.

Further, when the work of post card making has ended, the original reading device and the image printing device can be assembled into an integral unit by using the original placing and storage assisting device, so that it is made easy to store and take out the post card making device, definitely avoiding such a trouble that the original reading device and the image printing device are separated from one another with one being dislocated not to be available for the next use.

When the original placing and storage assisting device comprises the plate member of a rectangular contour substantially equal to the rectangular contour presented by the housing of the original reading device, and the connecting means for connecting the plate member to the image printing device in such a manner that the original reading device is sandwiched between the plate member and the bottom of the image printing device, the original reading device is sandwiched as a layer between the bottom of the image printing device and the original placing and storage assisting device, so that the layered construction presents a common side surface contour suited for handling of the assembly of the three devices as an integral unit.

When the original placing and storage assisting device includes a plate member of a rectangular contour substantially equal to the rectangular contour presented by the housing of the original reading device and connecting means for connecting the plate member to the image printing device with the original reading device being sandwiched between the plate member and the bottom of the image printing device, the original reading device is sandwiched as a layer between the bottom of the image printing device and the plate member of the original placing and storage assisting device, so that the layered body presents a common side contour, and the assembly of the three devices presents an external shape suited for handling as a single body.

When the connecting means are the turning ear members mounted to the two opposite sides of the rectangular contour of the plate member and adapted to be latched to the side walls of the image printing device across the thickness of the original reading device, the assembling and disassembling of the three devices can be very readily done, so that when the use of the post card making device has ended, the three devices will be immediately assembled without being felt troublesome, providing a compact storage of the post card making device, while excluding a danger that a part of the constructing elements of the device being dislocated.

When the image printing device is equipped with a handle at its upper portion so that the device is suspended from above with the bottom thereof facing downward, the image printing device can be conveniently handled in the manner of being suspended by a handle in a single unit as well as in an assembly with the original reading device and the original placing and storage assisting device attached to the bottom thereof.

BRIEF DESCRIPTION OF THE DRAWINGS

In the accompanying drawings.

DESCRIPTION OF THE PREFERRED EMBODIMENT

Figure 1:
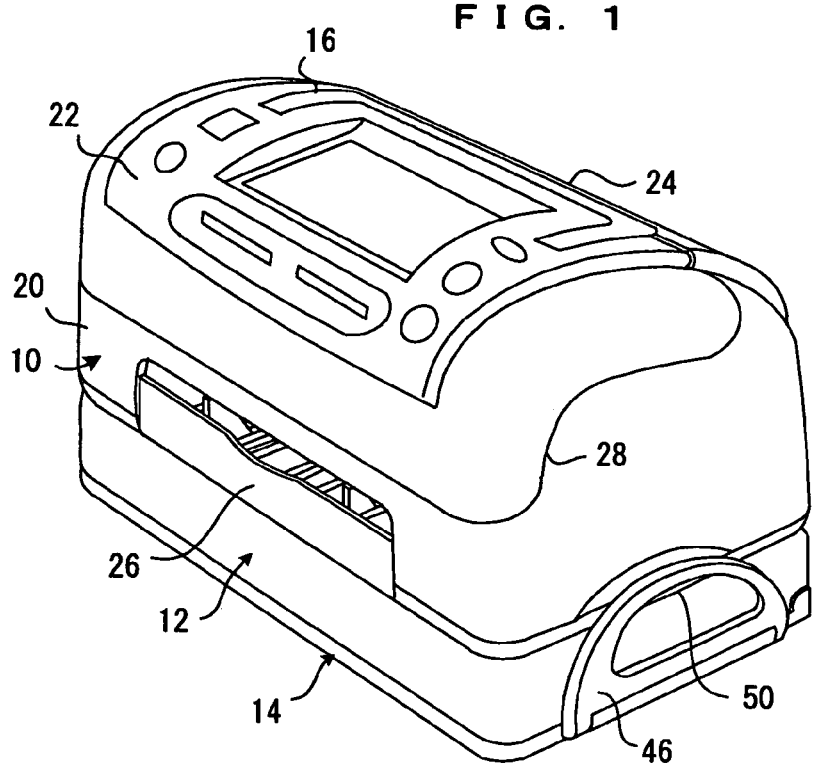
FIG. 1 is a perspective view showing an embodiment of the post card making device according to the present invention in its assembled state for storage.
Figure 2:
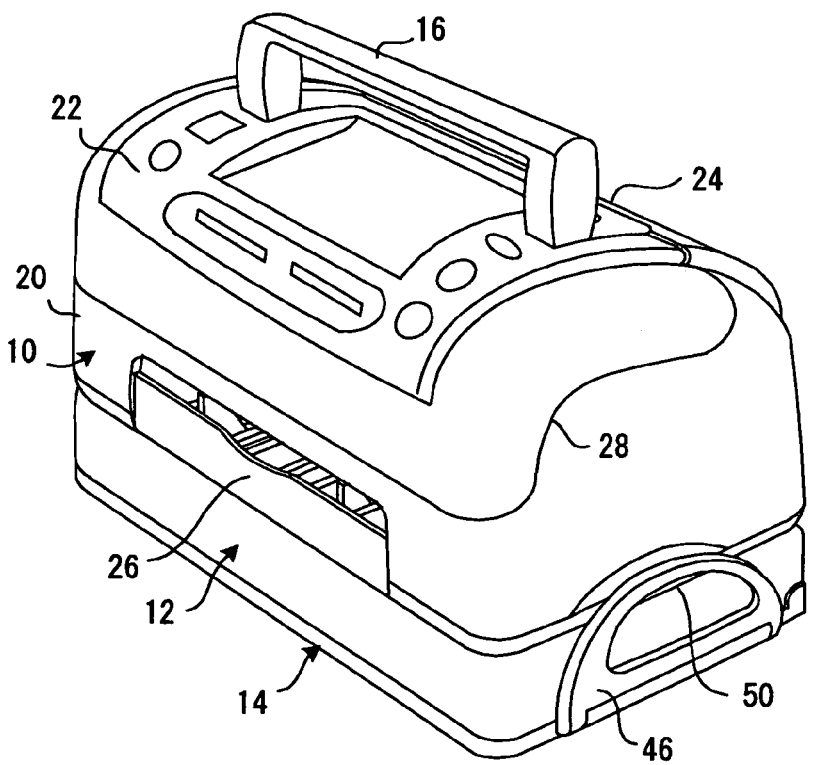
FIG. 2 is a perspective view similar to FIG. 1, showing the post card making device shown in FIG. 1 in a state where a handle provided at an upper portion of the image printing device was raised for grasping to suspend the assembly from above.
Figure 3:
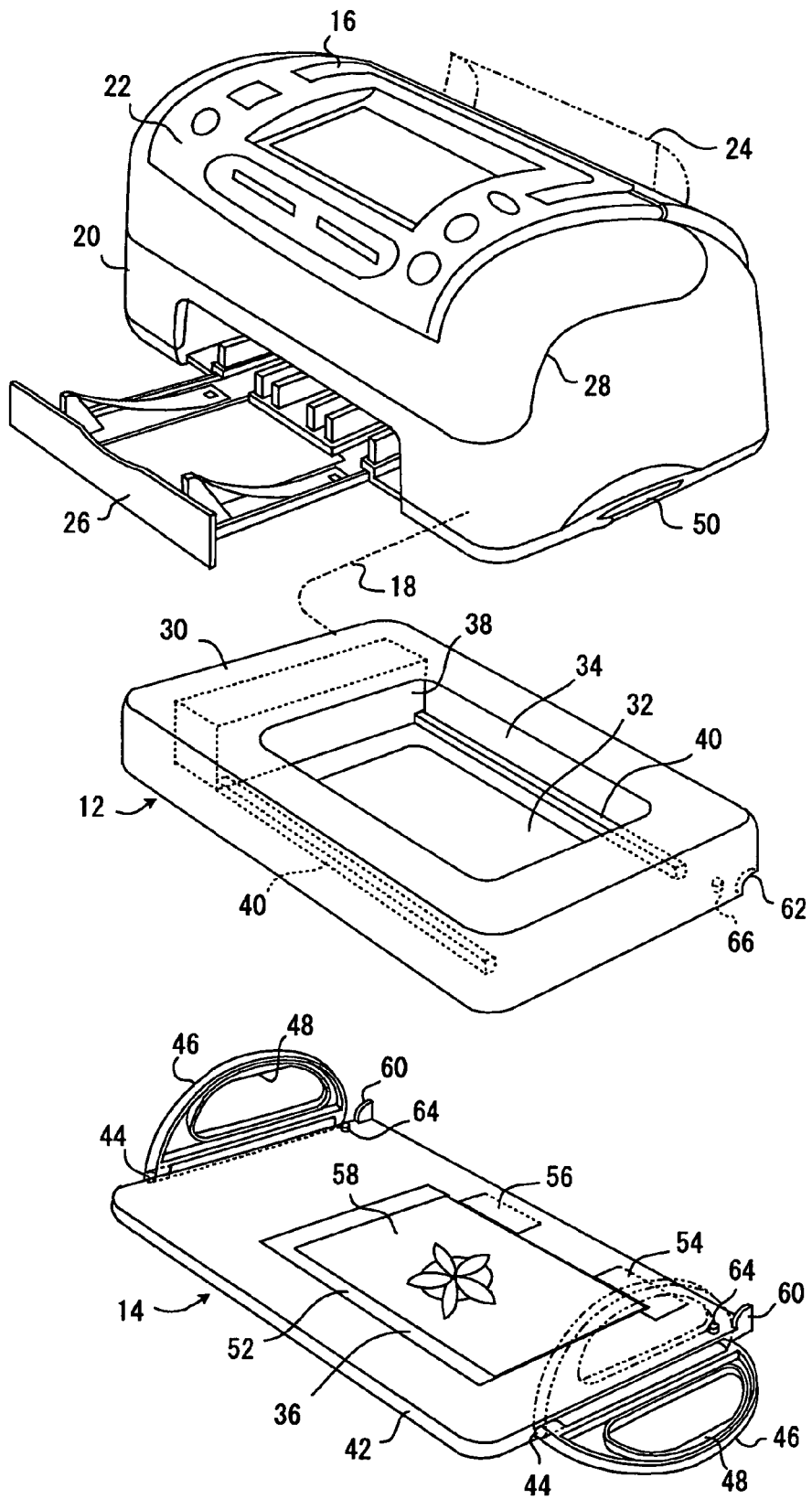
FIG. 3 is a perspective view showing the image printing device, the original reading device and the original placing and storage assisting device disassembled from the state shown in FIG. 1, with the print sheet discharge tray being extracted from the housing.

In these figures, 10 is the image printing device, 12 is the original reading device, and 14 is the original placing and storage assisting device. 16 is the handle provided at the top portion of the image printing device 10, the handle being normally stored within the external contour of the image printing device as shown in FIG. 1 and raised to project from the external contour of the image printing device as shown in FIG. 2 when the image printing device alone or it is suspended with the original reading device and the original placing and storage assisting device assembled thereto. And FIG. 3 is a perspective view showing the image printing device 10, the original reading device 12 and the original placing and storage assisting device 14 as disassembled and separated from one another from the state shown in FIG. 1. The image printing device 10 and the original reading device 12 are electrically connected by a removable wire harness 18 diagrammatically shown in the figure.

The image printing device 10 has a housing 20 in which an electric circuit means capable of calculations required for image digital processing and digital printing and ink jet printing means not shown in the figure but know in the art and adapted to be controlled at an operation panel 22 provided at an upper portion of the housing. 24 shows a part of a sheet supply fence in its closed condition, which, when opened as shown in FIG. 3 by a phantom line, can feed printing sheets slantly from an upper side thereof. The ink jet printing means is operated by an image electric signal generated by the electric circuit means, and the printing sheets provided with the printing are discharged onto a printing sheet discharge tray 26. The housing 20 is so constructed that a portion thereof confined by a bordering line 28 to include the control panel 22 can be turned by hinges not shown in the figure like a cover member relative to the portion therebelow, so as to expose the inside of the housing.

The housing 20 of the image printing device 10 has a rectangularly shaped bottom as will be readily understood from FIGS. 1, 2 and 3. The "rectangular" herein referred to means a shape which may be called to be rectangular as the shape of a practical body, not to be geometrically precisely "rectangular".

The original reading means 12 has an external contour like a rectangular thick plate formed by its housing 30. The housing 30 is provided with an original reading window 32 closed by a transparent glass plate or the like. The housing is also provided with a through viewing window 34 made of a glass plate or the like for confirming the original in its upper face corresponding to the original reading window 32, so that when the original reading device 30 is placed on the original placing and storage assisting device 14, an original placed on an original placing portion 36 of the original placing and storage assisting device can be seen from the upper side through the original reading window 32 and the through viewing window 34.

The original reading device 12 is equipped with an image sensor 38 which itself is known in the art in the housing 30, the image sensor being supported to reciprocate traversing the front of the original reading window 32 as guided by a pair of guide rails 40, while lightning an image by a light source incorporated therein and generating an electric signal expressing the read-in image. The external contour of the original reading device 12 formed by the housing 30 is also rectangular in its plan shape as will be readily understood from FIGS. 1, 2 and 3, the rectangular contour substantially coinciding with the rectangular contour of the bottom of the image printing device 10.

The original placing and storage assisting device 14 has a plate member 42 of a rectangular contour substantially coinciding with the rectangular plane contour of the original reading device 12, and a pair of ear members 46 rotatavely mounted to a pair of opposite sides of the plate member by hinges 44. In the shown embodiment, the ear members 46 are each an annular member of a half circular shape, to be easily held by inserting fingers into the annular shape of the ear members when the original placing and storage assisting device is in a separated state as shown in FIG. 3 to be held up or moved by hands. On the other hand, when an original image is produced on the original placing and storage assisting device, the ear members are turned down to extend on the same plane as the plate member 42, not to be a disturbance for the original image producing work.

Further, the pair of ear members 46 have each an engaging edge 48 provided at its top portion opposite to its root portion rotatably supported by the hinge 44, the engaging edges 48 each snappingly engaging an engaging jaw 50 provided at a corresponding position of the bottom of the image printing device 10 when the original placing and storage assisting device is mounted to the bottom of the image printing device 10 by sandwiching the original reading device 12 therebetween as shown in FIGS. 1 and 2, thereby stably holding an assembly of the image printing device 10, the original reading device 12 and the original placing and storage assisting device 14 for storage as shown in FIGS. 1 and 2.

The plate member 42 of the original placing and storage assisting device has the above-mentioned original placing portion 36 which is lined by an elastic sheet 52 like a sponge so that an image designed by an overlaying combination of cut out pictures, letters and the like can present a uniform plane surface. Further, original positioning means 54 and 56 are provided along an edge and a side adjacent thereto of the rectangular original placing portion 36. The original positioning means 54 is an elastic plane chip formed with an angular cut out portion for receiving one edge of a rectangular original 58, the angular cut out portion presenting an angular edge slightly projecting from the upper surface of the elastic floor sheet 52 of the original placing portion 36. The original positioning means 56 is an elastic plane chip having a linear edge for receiving one side of the rectangular original 58, the linear edge presenting a linear end slightly projecting from the upper surface of the elastic floor sheet 52 of the original placing portion 36. When the rectangular original 58 is placed on the original placing portion 36 with its one edge being engaged with two end faces of the angular cut out portion of the original positioning means 54, while one side of the original being engaged with the linear end face of the original positioning means 56, the rectangular original is positioned as predetermined relative to the original placing and storage assisting device 14.

Further, at each end of a pair of opposite sides of the rectangular contour of the plate member 42 of the original placing and storage assisting device there are provided a pair of sectoral projections 60 each having an outer contour of approximately a quarter of a circle, and corresponding thereto at each end of a pair of opposite sides of the rectangular contour of the original reading device 12 there are formed a pair of sectoral indents 62 each having an outer contour of approximately a quarter of a circle adapted to receive the sectoral projection 60 therein for sliding engagement therebetween along their arcuate surfaces. In relation thereto, the plate member 42 of the original placing and storage assisting device is provided with a pair of small projections 64 of a columnar shape adjacent to the sectoral projections 60, and corresponding thereto the original reading device 12 is formed with a pair of small holes 66 of a cylindrical shape adjacent to the sectoral indents 62, so that when the original reading device 12 is placed on the plate member 42 of the original placing and storage assisting device with the arcuate surfaces of the sectoral projections 60 and the sectoral indents 62 being contacted with one another, the columnar small projections 64 are received in the cylindrical small holes 66 as aligned thereto, whereby the laying-over of the original reading device 12 upon the plate member 42 of the original placing and storage assisting device is guided to a predetermined positioning of the two devices.

From the foregoing it will be understood that the original placing and storage assisting device 14 serves as an original placing tray for supporting a sheet exhibiting an image as positioned relative to the original reading device 12 when it reads in the image, while also serving as an assembling assist means for mounting the original reading device 12 to the bottom of the image printing device 10 so as to integrate these devices.

Although the present invention has been described in detail with respect to an embodiment thereof in the above, it will be apparent for those skilled in the art that various modifications are possible within the scope of the present invention.

The invention claimed is:

1. A post card making device comprising a combination of: an original reading device having a housing of an external shape like a rectangular thick plate with an original reading window of a size of a post card in one face thereof and an image sensor mounted in the housing for reading an image exhibited to the original reading window and generating an image signal expressing the read-in image, an image printing device having a signal processor that processes the image signal and ink jet printing device that prints an image corresponding to the image sigal, and an original placing and storage assisting device serving as an original placing tray for supporting a sheet exhibiting an image as positioned relative to the original reading device when the image is read in by the original reading device and serving to assemble the original reading device to a bottom of the image printing device to form an integral unit for storage, the original placing and storage assisting device including a connecting mechanism that selectively connects the original placing and storage assisting device with the image printing device such that the integral unit is formed by sandwiching the original reading device between the original placing and storage assisting device and the image printing device.

2. A post card making device according to claim 1, wherein the bottom of the image printing device presents a rectangular contour substantially equal to the rectangular contour presented by the housing of the original reading device.

3. A post card making device according to claim 2, wherein the original placing and storage assisting device includes a plate member of a rectangular contour substantially equal to the rectangular contour presented by the housing of the original reading device and the connecting meahanism connects the plate member to the image printing device by sandwiching the original reading device between the plate member and the bottom of the image printing device.

4. A post card making device according to claim 3, wherein the connecting meahanism includes turning ear members hinged to two opposite sides of the rectangular contour of the plate member to be latched to side walls of the image printing device across the thickness of the original reading device.

5. A post card making device according to claim 1, wherein the image printing device is provided with a handle at an upper portion thereof such that the image printing device is capable of being suspended from the handle with the bottom thereof facing downward.

6. A post card making device according to claim 2, wherein the image printing device is provided with a handle at an upper portion thereof such that the image printing device is capable of being suspended from the handle with the bottom thereof facing downward.

7. A post card making device according to claim 3, wherein the image printing device is provided with a handle at an upper portion thereof such that the image printing device is capable of being suspended from the handle with the bottom thereof facing downward.

8. A post card making device according to claim 4, wherein the image printing device is provided with a handle at an upper portion thereof such that the image printing device is capable of being suspended from the handle with the bottom thereof facing downward.

\* \* \* \* \*